US008510152B1

United States Patent
Rai

(10) Patent No.: US 8,510,152 B1
(45) Date of Patent: Aug. 13, 2013

(54) SYSTEM FOR CAPABILITY ASSESSMENT AND DEVELOPMENT

(75) Inventor: Saurabh Rai, New Delhi (IN)

(73) Assignee: Accenture Global Services Limited, Dublin (IE)

( * ) Notice: Subject to any disclaimer, the term of this patent is extended or adjusted under 35 U.S.C. 154(b) by 575 days.

(21) Appl. No.: 12/466,172

(22) Filed: May 14, 2009

(51) Int. Cl.
*G06Q 10/00* (2012.01)

(52) U.S. Cl.
USPC ........................................ 705/7.39

(58) Field of Classification Search
USPC ........................................ 705/7.39
See application file for complete search history.

(56) References Cited

U.S. PATENT DOCUMENTS

| 2004/0010441 | A1* | 1/2004 | Nandigama et al. | 705/10 |
| 2004/0167788 | A1* | 8/2004 | Birimisa et al. | 705/1 |
| 2004/0199416 | A1* | 10/2004 | Heina et al. | 705/10 |
| 2007/0021967 | A1* | 1/2007 | Jaligama et al. | 705/1 |

* cited by examiner

*Primary Examiner* — R. David Rines
*Assistant Examiner* — Amanda Gurski
(74) *Attorney, Agent, or Firm* — Brinks Hofer Gilson & Lione

(57) ABSTRACT

A tool is configured to determine process and service strengths as related to the accomplishment of one or more objectives. One or more processes include associated process information relating to various process attributes. The tool may execute a plurality of scoring modules to produce scores representative of strengths of processes and services as related to the accomplishment of the objectives. The scores may be used to identify processes for adjustment having a maximum impact on the scores.

15 Claims, 8 Drawing Sheets

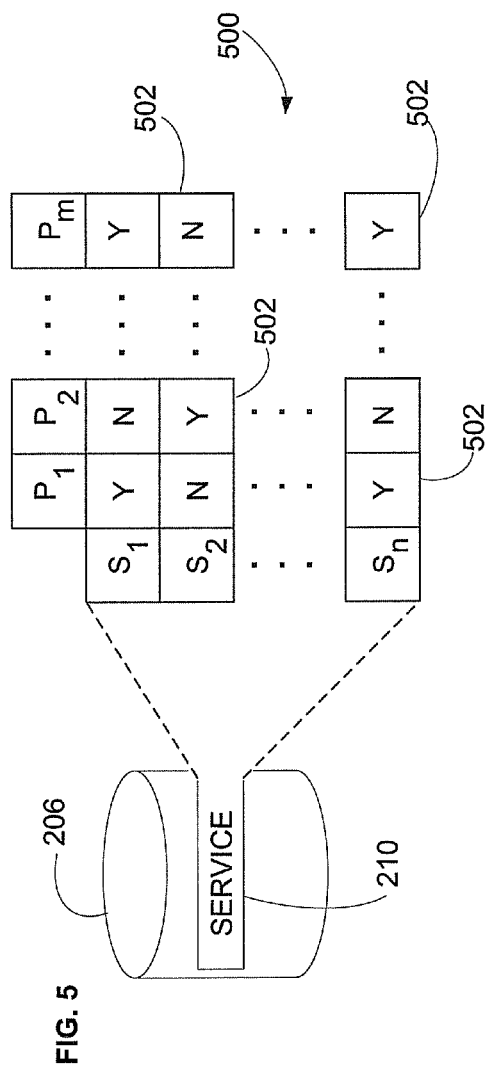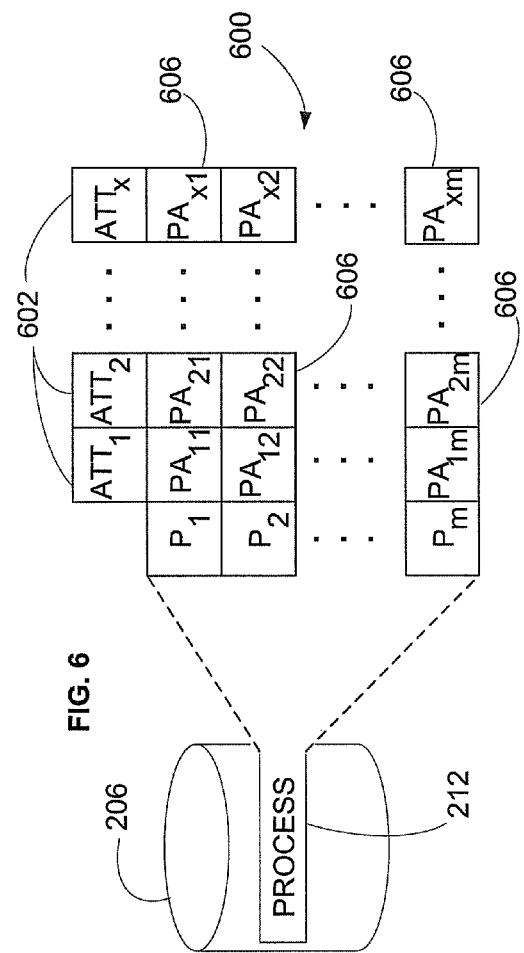

SYSTEM FOR CAPABILITY ASSESSMENT AND DEVELOPMENT

BACKGROUND

1. Technical Field

This application relates to a system used to perform an assessment of operations or tasks, to identify strengths and weaknesses, and to indicate the impact of possible changes to the operations or tasks.

2. Background

Organizations, such as businesses, are generally structured to accomplish various objectives of that organization's intended purpose. Each objective may include various manners in which to be performed. For example, each objective of the organization may be accomplished through performance of one or more services. Each service may include one or more processes.

SUMMARY

A tool may be configured to evaluate one or more capabilities, such as services and processes, with regard to accomplishing one or more objectives related to an organization. The tool may be configured to determine the process development for one or more processes with regard to accomplishment of an objective. In one example, information regarding a predetermined objective may be stored in a database. The objective may be associated with one or more predetermined services that may be performed in order to accomplish each objective. The objective, as well as the services, may be related to one or more predetermined processes. Each process may be implemented by a particular service to accomplish each particular related objective. Each process may also be directly implemented to accomplish each particular objective. The database may be configured to include process information relating to each of the processes. The process information may include information relating to various process attributes. Each process attribute may be related to at least one predetermined attribute category.

In one example, the tool may be configured to evaluate the strengths of processes and services with respect to accomplishment of one or more objectives. The tool may be configured to execute a first scoring module to process a matrix including process information related to processes associated with particular services and objectives. The first scoring module may convert the process information of the matrix into a scoring matrix. The scoring matrix may include numerical scores indicative of particular attributes of each process. The tool may execute a second scoring module to determine, for each service, average scores associated with one or more process attribute categories based on the scoring matrix. The tool may execute a third scoring module to determine an overall strength score for each service with respect to each objective. The overall strength score for each service may be based on the average scores. The tool may be further configured to determine, through execution of the first and second scoring modules, average scores associated with one or more process attribute categories associated with processes directly related to objectives.

The tool may be further configured to determine a frequency of association of each process to each service. The tool may implement the frequency of association as well as the scores from the scoring matrices associated with one or more attribute categories to identify one or more processes having a maximum impact on one or more overall strength scores upon adjustment of the identified processes.

Further objects and advantages of the present invention will be apparent from the following description, reference being made to the accompanying drawings wherein the preferred embodiments of the present invention are clearly shown.

BRIEF DESCRIPTION OF THE DRAWINGS

The innovation may be better understood with reference to the following drawings and description. The components in the figures are not necessarily to scale, emphasis instead being placed upon illustrating the principles of the invention. Moreover, in the figures, like-referenced numerals designate corresponding parts throughout the different views.

FIG. 5 is an example of a data set configured to store service and process relationships.

FIG. 6 is an example of a data set configured to store process information.

DETAILED DESCRIPTION

A tool may be configured to evaluate strengths of capabilities, such as services and processes, with regard to accomplishment of one or more objectives. The tool may retrieve information from a database regarding objectives, services, and processes. Each process may have associated process information regarding various process attributes. The tool may execute scoring modules to determine the strength of a service with respect to the accomplishment of each objective based on scores associated with the various process attributes. The tool may also execute scoring modules to determine the strength of processes with respect to particular objectives. The process attributes of each process may also be implemented to identify processes for improvement that may maximize an increase in the strength of services with respect to accomplishment of one or more objectives.

Figure 1:
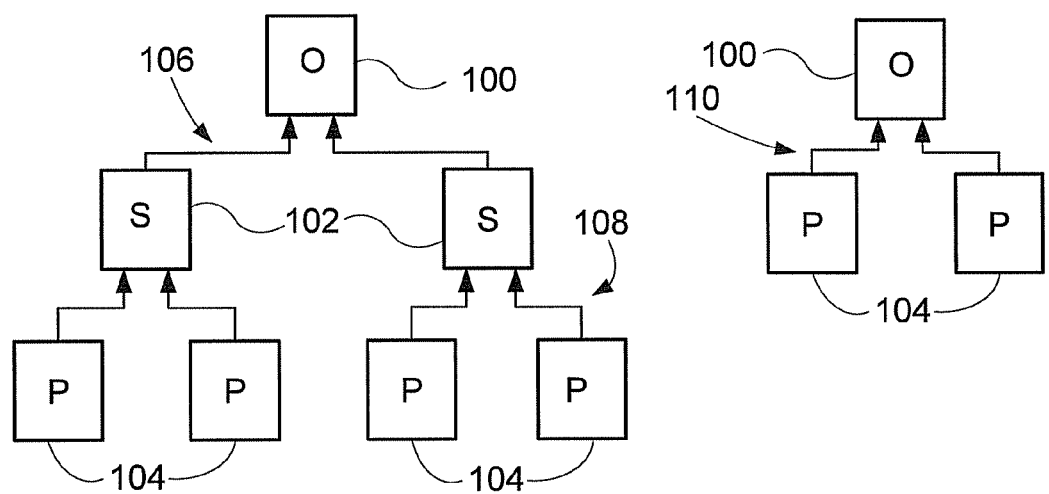
FIG. 1 is a diagrammatic example of relationships between objectives, services, and processes.

FIG. 1 includes example block diagrams indicating relationships between objectives (O) 100, services (S) 102, and processes (P) 104. In one example, the objective 100 may be a market-related objective, such as managing short term debt, cost containment, mergers and acquisitions (M&A), margin management, working capital management, capital projects, customer acquisition, and workforce reduction, for example. In one example, service (S) 102 may be a particular action or actions selectively applied toward achieving some particular objective (O) 100, such as customer-based services including customer care transformation, customer information system (CIS) transformation and application support, customer care business transformation outsourcing, or other services such as business process capacity services, demand management, and business process outsourcing services, for example. In one example, the process (P) 104 may be a particular action or actions that may be performed as part or all of a particular service (S) 102. Table 1 below provides an example of various processes (P) 104 that may be used to perform a particular service (S) 102 related to electrical utilities.

may indicate that in order for a process 104 to be related to accomplishing the objective 100, the process 104 should be related to the service 102.

Figure 2:
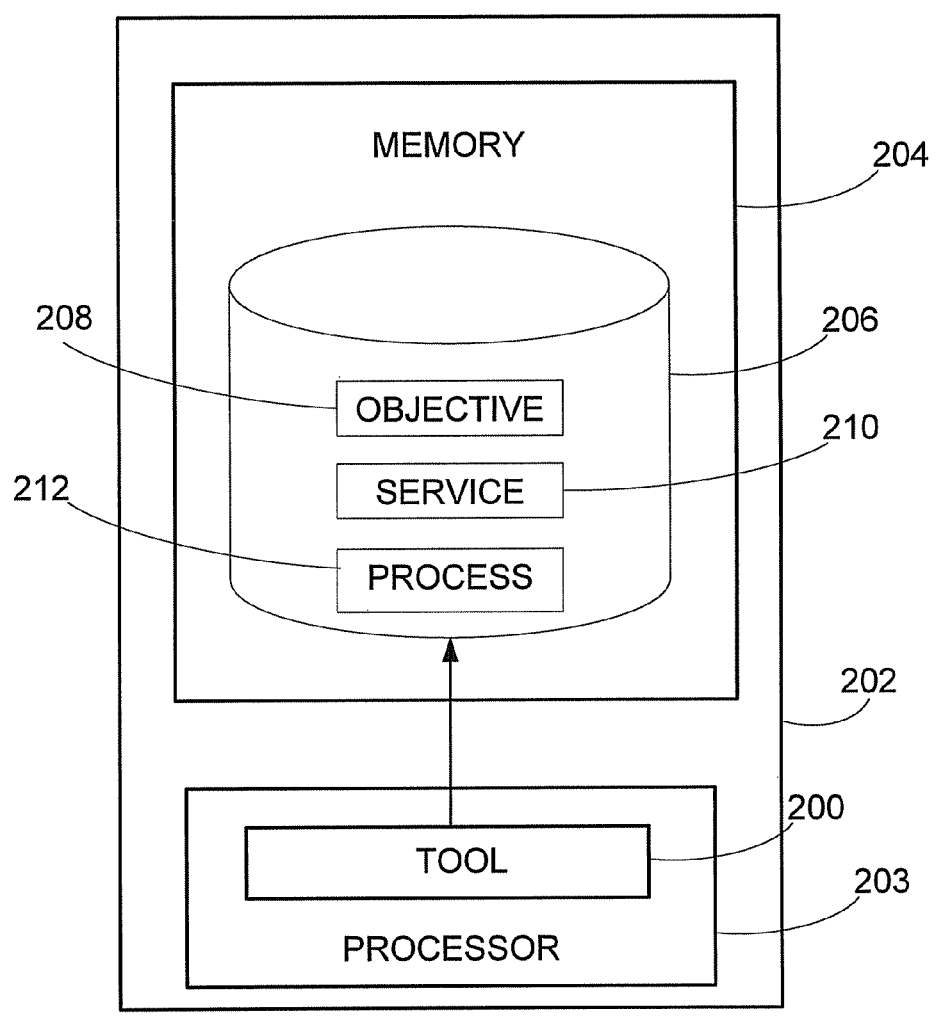
FIG. 2 is an example computer device.

FIG. 2 is a block diagram implementing a tool 200. The tool 200 may be implemented on a computer device 202. The computer device 202 may include a processor 203 and a memory 204. The tool 200 may be executed on the processor 203. The memory 204 may include a database 206. The memory 204 may include one or more memories and may be

TABLE 1

| Process | Process | Process | Process |
|---|---|---|---|
| Long and Medium Term Planning | Channel Management | Settlement | Onboarding |
| Investment Analysis | Brand Management | Field Request Management | Training |
| Capital and Original Manufacturing Budgeting | Campaign Management | New Connection | Quality Management |
| Investment Review | Lead/Prospect Management | Emergency Response | Knowledge Management |
| Regulatory Strategy Integration | Loyalty Management | Meter Data Management | Coaching |
| Regulatory Interface Management | Customer Acquisition | Customer Insight | Performance Management |
| Market Intelligence | Cross Sell/Up Sell | Marketing Analytics | People Development |
| Brand Strategy | Retention | Sales Effectiveness | People Advocacy |
| Customer Value and Segmentation | Customer Contact | Operational Insight | Vendor Management |
| Customer Information Strategy | Usage | Predictive Decision Analytics | Industry Transaction Management |
| Product and Service Development Management | Billing | Complaint Management | Technology & Infrastructure Management |
| Partner Relationship and Alliance Development | Payments | Customer Recovery | Onboarding |
| Tariff and Rate Management | Credit & Collections | Service Performance | Training |
| Energy Efficiency and Demand Side Management | Demand Forecast | Risk & Control Management | Quality Management |
| Social Responsibility | Procurement | Workforce Planning | Knowledge Management |
| Transmission and Distribution Integration | Contract Management | Settlement | Coaching |
| Long and Medium Term Planning | Channel Management | Field Request Management | Performance Management |

FIG. 1 illustrates an example objective-service relationship 106 that may indicate that services (S) 104 are of a type that may be performed in order to accomplish one or more objectives (O) 100. The objective-service relationship 106 further indicates that each particular service (S) 102 may implement one or more processes (P) 104 to perform the particular service (S) 102. FIG. 1 also shows a service-process relationship 108. The service-process relationship 108 indicates that the processes 104 may be performed as part of performing the service 102. FIG. 1 also illustrates an example objective-process relationship 110. The objective-process relationship 110 indicates that processes (P) 104 may be directly associated with the accomplishment of one or more objectives (O) 100.

The relationships 106 and 108 in FIG. 1 may be applied to a plurality of objectives (O) 100, services (S) 102, and processes (P) 104. In one example, the relationships 106 and 108 may be used to determine the strength of services (S) 102 and processes (P) 104 with regard to accomplishing one or more objectives (O) 100. The strengths of the processes (P) 104 and the services (S) 102 may indicate the level of development of each process (P) 104. In one example, a particular service (S) 102 may have a plurality of associated processes (P) 104 that may be performed to carry out the particular service (S) 102. In another example, a plurality of services (S) 102 may be available to perform in order to accomplish the objective (O) 100. The relationships 106 and 108 indicate that one or more processes (P) 104 may be related to the particular service 102, as well as the objective 100. The relationships 106 and 108 computer-readable storage media or memories, such as a cache, buffer, RAM, removable media, hard drive or other computer readable storage media. Computer readable storage media may include various types of volatile and nonvolatile storage media. Various processing techniques may be implemented by the processor 203 such as multiprocessing, multitasking, parallel processing and the like, for example. The processor 203 may include one or more processors.

The database 206 may include an objective data set 208. The objective data set 208 may include information regarding a plurality of objectives (O) 100. The database 206 may also include a service data set 210. The service data set 210 may include information associated with a plurality of services (S) 102. The database 206 may also include a process data set 212. The process data set 212 may include information associated with a plurality of processes (P) 104. The processor 203 may be configured to access the memory 204, and particularly, the database 206. In other examples, each of the data sets 208, 210, and 212 may include any of the information associated with the objectives (G) 100, services (S) 102, and processes (P) 104.

Figure 3:
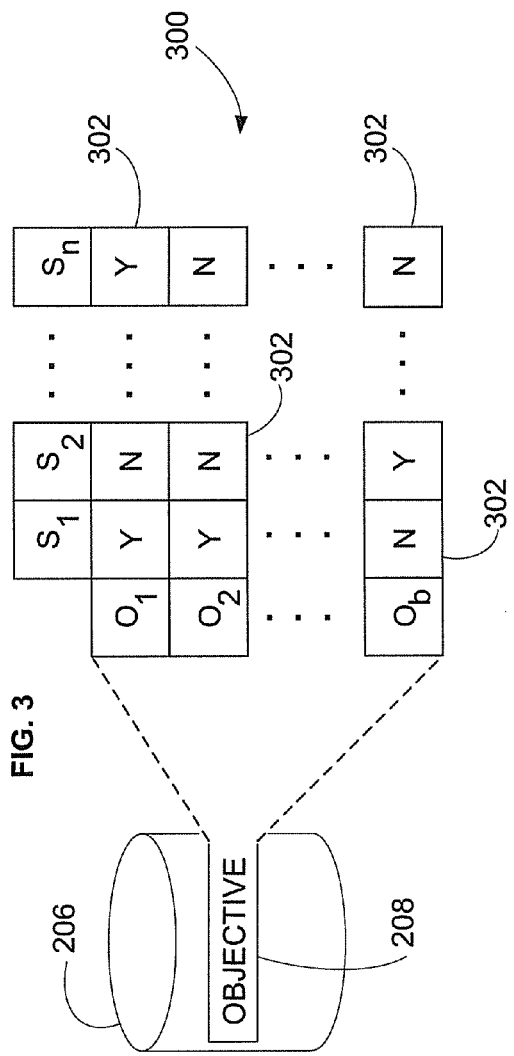
FIG. 3 is an example of a data set configured to store objective and service relationships.

In one example, the objective data set 208 may store various data sets including information relating to services (S) 102 and processes (P) 104 associated with at least one objective (O) 100. For example, FIG. 3 shows an objective-service data set 300 that may be stored within the objective data set 208. The objective-service data set 300 includes information relating each objective (O) 100 to each service (S) 102. In FIG. 3, each objective (O) 100 is individually designated as $O_1$ through $O_b$ and each service (S) 102 is individually designated as $S_1$ through $S_n$, where "b" and "n" may be the maximum number of objectives (O) 100 and services (S) 102, respectively, stored in the database 206.

The objective-service data set 300 may include information indicating whether performance of a particular service (S) 102 is related to a particular objective (O) 100. In FIG. 3, relationship information in the data set 300 is represented as a plurality of cells 302. Each cell 302 may include information indicating if a particular service (S) 102 is related to a particular objective (O) 100. In FIG. 3, each cell 302 is illustratively shown as including a "Y" for yes or "N" for no. The "Y" may indicate that a service (S) 102 is related to accomplishing an objective (O) 100. The "N" may indicate that performance of a service (S) 102 is not related to accomplishing a particular objective (O) 100.

An example of the objective-service data set 300 is provided in Table 2. In Table 2, two example objectives (O) 100, M&A and Working Capital, are shown as being associated with particular services (S) 102, customer care transformation (CCT) and customer information systems (CIS) transformation and application support. In the objective-service data set 300, the services in Table 2 may be indicated as being related to the particular objectives (O) 100.

TABLE 2

| OBJECTIVE | SERVICE |
| --- | --- |
| M&A | CCT |
|  | CIS |
| Working Capital | CCT |
|  | CIS |

Figure 4:
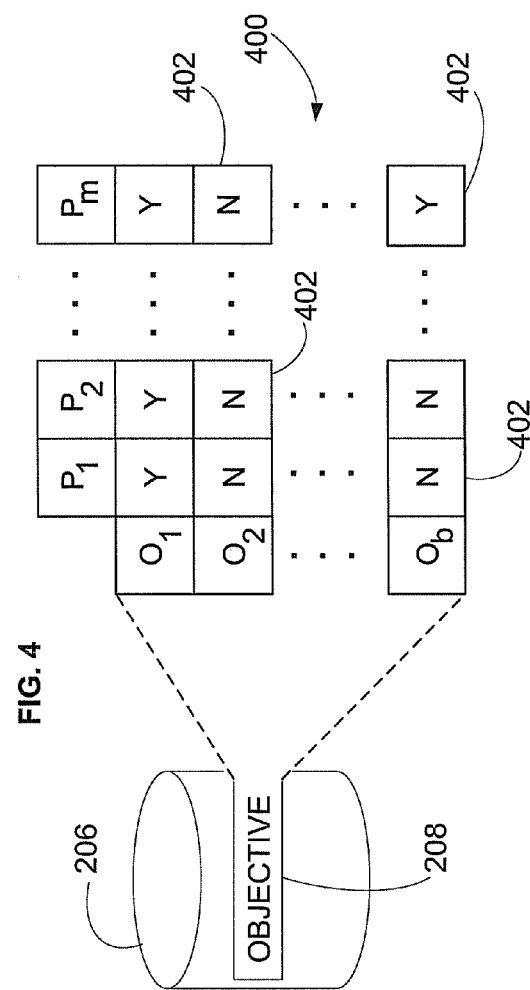
FIG. 4 is an example of a data set configured to store objective and process information relationships.

Similarly, FIG. 4 shows an objective-process data set 400 that may be included in the objective data set 208. The objective-process data set 400 may include information indicating whether a particular process (P) 104 is related to a particular objective (O) 100. In FIG. 4, this information in the objective-process data set 400 is represented as a plurality of cells 402. In FIG. 4, each process (P) 104 is individually designated as $P_1$ through $P_m$, where "m" is the total number of processes 104 stored in the database 206. In FIG. 4, each cell 402 may include a "Y" for yes or "N" for no. The "Y" may indicate that a process (P) 104 is related to accomplishing an objective (O) 100. The "N" may indicate that performance of a process (P) 104 is not related to accomplishing a particular objective (O) 100.

An example of the objective-process data set is provided in Table 3. In Table 3, the two example objectives (O) 100, M&A and working capital are shown as being associated with particular processes (P) 104. In the objective-process data set 400, the objectives (O) 100 may have common associated processes (P) 104 as shown in Table 3 through "Long & Medium Term Planning" and "Investment Analysis."

TABLE 3

| OBJECTIVE | PROCESS |
| --- | --- |
| Mergers and Acquisitions | Long & Medium Term Planning |
|  | Investment Analysis |
|  | Channel Management |
|  | Brand Management |
| Working Capital | Long & Medium Term Planning |
|  | Investment Analysis |
|  | Performance Management |
|  | Technology and Infrastructure Management |
|  | Market Intelligence |

The database 206 may also be configured to store relationship data between the services 102 and the processes 104. As shown in FIG. 5, the service data set 210 may include a service-process set 500. The service-process data set 500 may include information indicating whether a particular process (P) 104 is related to a service (S) 102. In FIG. 5, this information in the service-process data set 500 is represented as a plurality of cells 502. In FIG. 4, each process (P) 104 is individually designated as $P_1$ through $P_m$. In FIG. 5, each cell 502 may include a "Y" for yes or "N" for no. The "Y" may indicate that a process (P) 104 is related to a service (S) 102. The "N" may indicate that performance of a process (P) 104 is not related to accomplishing a particular service (S) 102.

An example of the service-process data set 500 is provided in Table 4. In Table 4, the two example services (S) 104 are CCA and CIS transformation and application support and associated processes (P) 104. Table 4 is an example of the information maintained in the service-process data set 500. For example, each process (P) 104 listed for each service (S) 102 would have a "Y" in the corresponding cell 502 of the service-process data set 500. As illustrated in Table 4, the services (S) 102 may have commonly-associated processes (P) 104.

TABLE 4

| SERVICE | PROCESS |
| --- | --- |
| CCT | Long & Medium Term Planning |
|  | Investment Analysis |
|  | Channel Management |
|  | Brand Management |
|  | Market Intelligence |
| CIS | Long & Medium Term Planning |
|  | Investment Analysis |
|  | Performance Management |
|  | Technology and Infrastructure Management |
|  | Market Intelligence |

Each process (P) 104 may be associated with various process information. The process information may be related to various process attributes. The process data set 212, or other data set, may be configured to include the process information associated with each attribute. In one example, the processes (P) 104 may each be associated with a plurality of process attributes (PA). Each process attribute (PA) may be associated with a predetermined process attribute category (ATT). In one example, a process attribute data set 600 may be stored in the process data set 212. The process attribute data set 600 may include process attributes (PA) associated with each process (P) 104. In FIG. 6, the process attribute data set 600 includes a plurality of process attribute categories (ATT) 602. Each process (P) 104 may have an associated attribute for each related attribute category (ATT) 602. In FIG. 6, each attribute category 602 is individually designated as $ATT_1$ through $ATT_x$, where "x" may be the total number of process attribute categories 602. The process attribute data set 600 in FIG. 6 includes a plurality of cells 606 that each includes a particular process attribute (PA) for the associated attribute category (ATT) 602. In FIG. 6, each cell 606 includes process attribute information "$PA_{yz}$", where "y" is the index of the attribute category 602, 1 through x, and "z" is the index of the particular process (P) 104.

In one example, each attribute category 602 may represent a particular quality of a process, such as the processes (P) 104. For example, one attribute category 602 may be "Content Details," which may describe a level of development of a particular process 104 based on predetermined criteria. In one example, the development of each process may be defined by four particular levels. Each process (P) 104 may be defined as: 1) processes flow charts/models available; 2) partial process flow charts/models available; 3) process decomposition completed; and 4) only capabilities identified. The levels 1 through 4 describe the highest to lowest level of development for each process (P) 104.

Another example attribute category 602 may be whether or not a "Capability Assessment Model" (CAM) is defined for a particular process (P) 104. A CAM may be a specific model defining various capability levels uniformly applied to each process (P) 104. The existence or non-existence of a CAM for a particular process (P) 104 may be reflected in one of the attribute categories 602 as "defined" or "not defined."

Another example attribute category 602 may be whether or not a particular process (P) 104 is associated with one or more "key performance indicators" (KPIs). In one example, a KPI may be defined as particular metric or measure indicative of a level of success of a particular process. A defined "KPI" of a particular process (P) 104 with one or more KPIs may be reflected in one of the attribute categories 602 as "defined" or "not defined." Another example attribute category is "Classification of Capability." The "Classification of Capability" may be defined based on four levels: 1) strategic capability; 2) commodity capability; 3) core capability; and 4) enterprise/service lines (SL). The strategic capabilities may be include capabilities that drive competitive advantage, such as those linked to customer interaction or capabilities with a high degree of innovation in the market. The commodity capabilities may include capabilities that have limited business value. The core capabilities may include those capabilities that drive operational excellence. The enterprise/SL capabilities may be those capabilities that are not focus area for industry and mostly owned by service lines.

Table 5 provides an example of various attribute categories and the associated process information for a number of the processes (P) 104 from Table 4. Table 5 is an example of the process information that may be maintained in the process data set 600.

TABLE 5

| Process | Classification of Capabilities | Content Details | CAM | KPI |
|---|---|---|---|---|
| Long & Medium Term Planning | Strategic Capability | Partial Process Flow Charts/Models Available | Defined | Defined |
| Investment Analysis | Strategic Capability | Partial Process Flow Charts/Models Available | Defined | Defined |
| Channel Management | Commodity Capability | Process Decomposition Done | Defined | Defined |
| Brand Management | Strategic Capability | Process Decomposition Done | Defined | Defined |
| Market Intelligence | Strategic Capability | Partial Process Flow Charts/Models Available | Defined | Defined |

Figure 7:
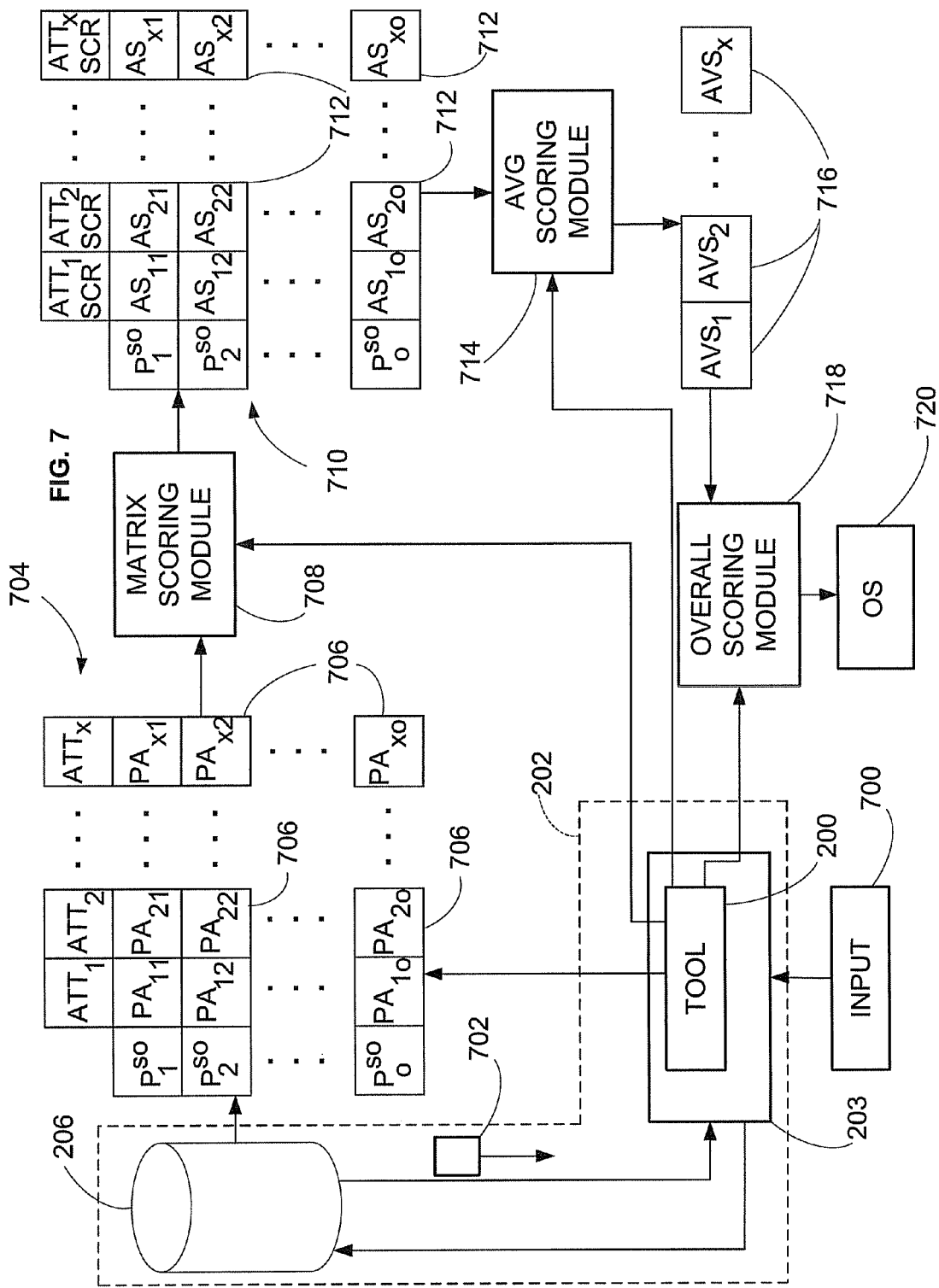
FIG. 7 is an example of a tool configured to determine a strength of a service as related to a process.

In the example shown in FIG. 7, the data sets 300, 400, 500, and 600 may be implemented by the tool 200 to determine the strength of services (S) 102 as related to accomplishing one or more objectives (O) 100 based on the respective processes (P) 104 of the services (S) 102 used to accomplish particular objectives (O) 100. Identifying one or more objectives (O) 100 may allow the services (S) 102 and processes (P) 104 related to the identified objectives (O) 100 to also be identified using the data sets 300 and 400. Furthermore, identification of services (S) 102 and processes (P) 104 related to the identified one or more objectives 100 allows only those processes (P) 104 to be identified that are also related to the both a particular service (S) 102 and to a particular objective (O) 100.

During operation, the processor 203 may receive an input 700. The input 700 may be associated with at least one of the objectives (O) 100. For example, the processor 203 may receive input 700 via a user interface, such a keyboard, touch screen, or other suitable interface device. The input 700 may be a particular objective or objectives (O) 100 or the input may be information related one or more objective (O) 100. The tool 200 may receive the input 700 and determine the particular objectives (O) 100 related to the input based on the information. The input 700 may be provided according to a predetermined format allowing various informational fields to be completed in order for the tool 200 to determine particular objectives (O) 100.

In the example of FIG. 7, only one objective ($O_c$) 100 may be identified, where "c" is an index of a particular objective $O_1$ through $O_m$ included in the database 206. However, the input 700 may be associated with any number of objectives (O) 100. The input 700 may be used by the tool 200 to access the database 206 to retrieve information related to the objectives (O) 100. In one example, the tool 200 may be configured to use the input 700 to retrieve information 702 from data sets 300, 400, 500, and 600 related to the objective ($O_c$) 100. Each objective (O) 100, service (S) 102, and process (P) 104 included in the data sets 300, 400, 500 may include a unique identifier. The unique identifier may allow the tool 200 to identify particular objectives (O) 100, services (S) 102, and processes (P) 104 based on an input, such as the input 700. The unique identifiers may allow the tool 200 to form the relationships identified in the data sets 300, 400, and 500.

The tool 200 may use the information 702 to identify the process information (PA) associated with each process (P) 104 that is related to the objective $O_c$ and to each service (S) 102 that is related to the objective $O_c$. For example, the tool 200 may implement the data sets 300, 400, 500, and 600 to identify the process information (PA). Using the identified objective $O_c$ as a reference, the tool 200 may identify each service (S) 102 related to the objective $O_c$ using the objective-service data set 300. The tool 200 may then cross reference the services (S) 102 identified with the service-process data set 500 to identify all of the processes (P) 104 associated with each identified service (S) 102. These identified processes (P) 104 may be filtered by the association with objective $O_c$ using the objective-process data set 400. The tool 200 may generate a process information matrix 704 to include the process attribute information associated with each identified process (P) 104.

Tables 2 through 4 provide an example of such a progression. Upon identification of an objective (O) 100, such as M&A, the tool 200 may identify the services (S) 102 associated with the M&A objective, as shown in Table 2. The tool 200 may then identify processes (P) 104 associated with the identified services (S) 102, as shown in Table 4. The tool 200 may then determine which of the identified processes (P) 104 associated with the identified services (S) 102 (Table 4) are also associated with the identified objective $O_c$ (Table 3). Cross-referencing the information in Table 3 with Table 4 will allow identification of processes (P) commonly related to identified services (S) 102 and the identified object $O_c$. For example, when Table 4 is cross-referenced with Table 3, the process "Market Intelligence" is shown as not related to the M&A objective. Thus, in creating the process information matrix 704, the process "Market Intelligence" would not be included.

The matrix 704 includes the process attribute (PA) for each identified process (P) 104 that is related to the objective $O_c$ 100 and to services (S) 102 that are also related to the objective $O_c$ and processes (P) 104. Each process (P) 104 included in the matrix 704 is individually designated as "$P_a^{SO}$", where "a" is the index of the processes (P) 104, $P_1$ through $P_m$, identified by the tool 200. The superscript "S" represents that a particular process (P) 104 is related to a particular service (S) 102, and the superscript "O" represents that a particular process (P) 104 is related to an objective (O) 100, such as the objective $O_c$. In FIG. 7, the last process $P_o^{SO}$ has an index of "o," representing the last process (P) 104 index in the matrix 104, which may be less than or equal to "m." The process information matrix 704 includes the process attribute (PA) for each process $P_a^{SO}$ categorized into the various attribute categories 602. In FIG. 7, each cell 706 of the matrix 704 includes process information $PA_{yz}$, where "y" is the index of the process attribute category (ATT) and "z" is the index of the process (P) 104. For example, based on the example described above with regard to Tables 2 through 4, the process information matrix 704 includes information such as that illustrated in Table 5, except that the entry for "Market Intelligence" would be excluded.

Once the process information matrix 704 is established, the tool 200 may execute a matrix scoring module 708. The matrix scoring module 708 may convert the process information (PA) in the process information matrix 704 into numerical scores. The numerical scores may indicate strength of a particular process attribute (PA) relative to predetermined criteria. In one example, the matrix scoring module 708 generates an attribute score matrix 710. The attribute score matrix 710 includes a matrix of scores, where each cell 712 includes the score for a particular a ibute (ATT) for each particular process $P_a^{SO}$. Each score in the attribute score matrix 710 is individually designated as "$AS_{yz}$," where "y" is the index of the attribute (ATT) and "z" is the index of the process ($P_a^{SO}$) 104. The attribute scores (AS) for each process $P_a^{SO}$ may reflect the attribute strength of each attribute (PA) of the processes $P_a^{so}$ as the strength relates to accomplishing the objective $O_c$.

In one example, Table 6 shows a process attribute score matrix, based upon the process information matrix of Table 5, excluding "Market Intelligence." In Table 6 a scoring system may be implemented for each particular attribute category 602. Each attribute category may include a unique scoring system or may use one or more common scoring systems. For example, the "Content Details" attribute may be scored into four discreet scores, 1-0.75-0.5-0.25, with each score corresponding to one of the development levels 1 through 4, respectively. The KPI attribute may be scored such that if a KPI is defined, a "1" is scored and a "0" is scored if the KPI has not been defined. Similarly, the CAM attribute category may be scored a "1" if a CAM has been defined and a "0" scored if it has not been defined. The Classification of Capability may be scored such that a strategic capability, commodity capability, and a core capability may be scored as "1" and an enterprise/service capability may be scored as "0.5." Based on this scoring system, the attribute scoring matrix generated from the examples described for Tables 2 through 5 would contain the scores provided in Table 6.

TABLE 6

| Process | Classification of Capabilities | Content Details | CAM | KPI |
|---|---|---|---|---|
| Long & Medium Term Planning | 1 | 0.75 | 1 | 1 |
| Investment Analysis | 1 | 0.75 | 1 | 1 |
| Channel Management | 1 | 0.5 | 1 | 1 |
| Brand Management | 1 | 0.5 | 1 | 1 |
| Market Intelligence | 1 | 0.75 | 1 | 1 |

Upon establishment of the attribute score matrix 708, the tool 200 may execute an average scoring module 714. The average scoring module 714 may determine an average score 716 for each process attribute (PA) based on the scores included in the attribute score matrix 708. Each average score 716 is designated as $AVS_d$, where "d" is the index of the particular attribute category (ATT) 1 through x. For example, each score for a particular attribute category 602 in Table 6 may be averaged such that one average score per attribute category 602 is generated.

Upon establishment of the average scores 716, the processor 200 may execute an overall scoring module 718. The overall scoring module 718 may process one or more of the average scores 716 to determine an overall score (OS) 720. The overall score 720 may indicate the strength of the service (S) 102 as the service (S) 102 relates to accomplishing the objective ($O_c$). In one example, the overall score 720 may be determined through a weighted sum of selected average scores 716. The weighted sums may be implemented when a particular attribute category (ATT) is deemed to be more indicative of a process strength as compared to other attribute categories (ATT). For example, in Table 6 the overall score may include the Content Details, KPI, and CAM average scores. These average scores may be implemented in following equation:

$$OS = 0.5*(\text{Content Details})_{AV} + 0.2*(KPI)_{AV} + 0.3*(CAM)_{AV} \quad \text{(Eqn. 1)}$$

where $(\text{Content Details})_{AV}$ is the average score of the Content Details attribute category, $(KPI)_{AV}$ is the average score of the KPI attribute category, and $(CAM)_{AV}$ is the average score of the CAM attribute category.

Figure 8:
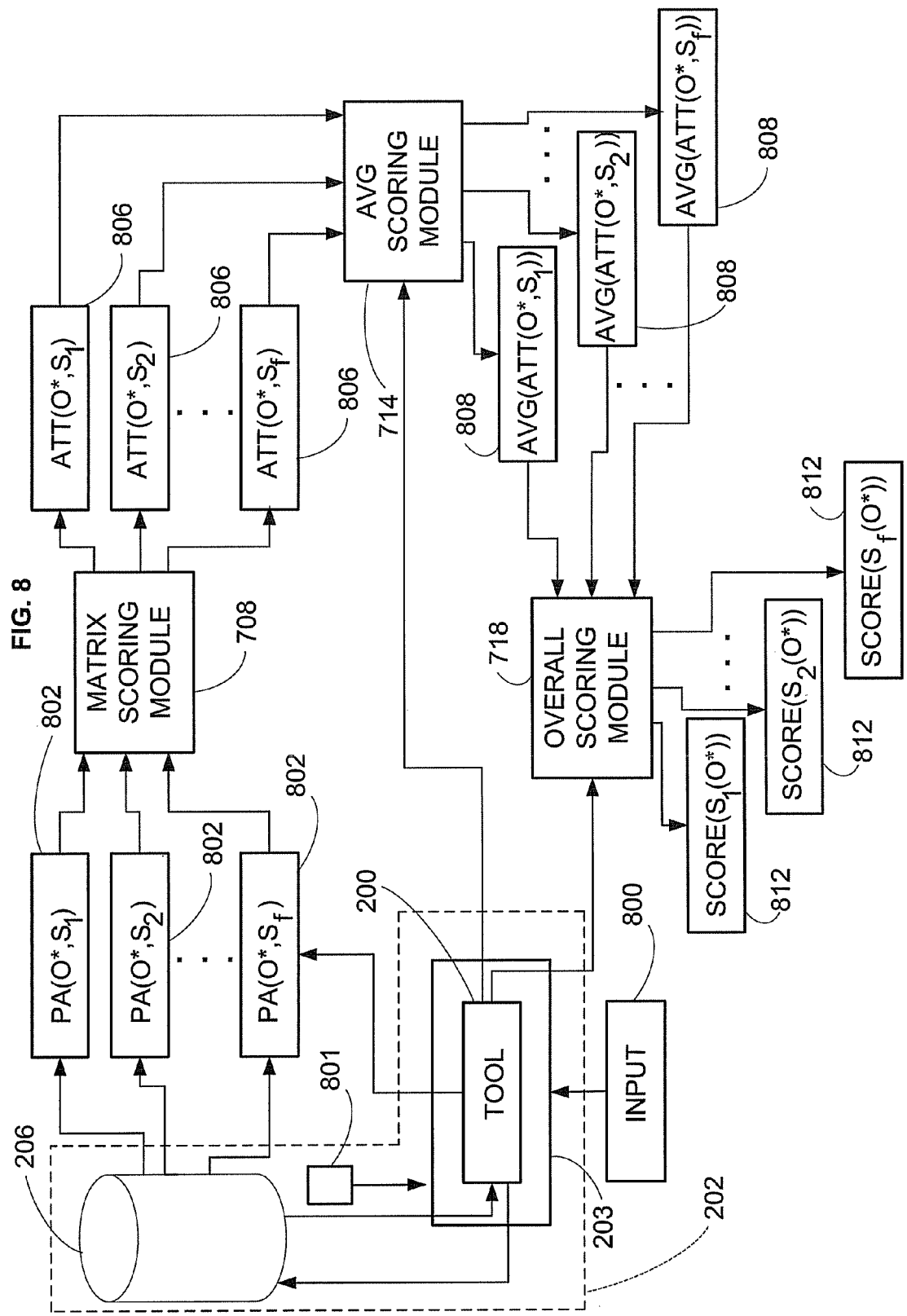
FIG. 8 is an example of a tool configured to determine a plurality of service strengths as related to a plurality of processes.

The tool 200 may also execute the scoring modules to generate overall scores, such as the overall score 720, for a plurality of services (S) 102 associated with a plurality of objectives (O) 100. In the example of FIG. 8, the tool 200 may receive an input 800. The input 800 may be similar to the input 700. The input 800 may include particular objectives (O) 100, or may include information allowing the tool 200 to identify particular objectives (O) 100. Based on the input 800, the tool 200 may access the database 206 to retrieve information 801 related to a plurality of objectives (O) 100, which may be some or all of the objectives $O_1$ through $O_c$. As similarly described with regard to FIG. 7, based on the input 800, the tool 200 may identify specific objectives (O) 100 and may access specific information related to the objectives (O) 100. The tool 200 may retrieve process information (PA) for processes (P) 104 related to each service (S) 102 associated to a plurality of objectives (O) 100.

In FIG. 8, the process information (PA) is designated as present in a plurality of data sets $(PA(O^*, S_f))$ 802, where "PA" is the process attribute information for each process (P) 104 that is associated with a particular service (S) 102, "O*" is the plurality of objectives (O) 100 identified based on the input 800, and "f" is the index of the particular services (S) 102, related to each of the plurality of objectives O*. Thus, each data set 802 may include a data set 704 for each service (S) 102 related to the objectives O*. The process attributes (PA) in each data set 704 may be obtained through the associations between the objectives (O) 100, services (S) 102, and processes (P) 104 as illustrated in the data sets 300, 400, 500, and 600 in a manner similarly described with regard to FIG. 7.

The tool 200 may execute the matrix scoring module 708 for each data set 802 to generate a plurality of attribute score matrices 806. Each plurality of attribute score matrices 806 is individually designated as (ATT(PA(O*,S$_f$)). Each plurality of attribute score matrices 806 may include an attribute score matrix 710 for each objective (O) 100 of the plurality of objectives O* as associated with a particular service (S) 102. For example, in FIG. 8, if the number of objectives included in the plurality of objectives O* equaled six, then data set ATT(PA(O*,S$_f$)) 806 would include six attribute score matrices 710. With respect to the example described regarding Tables 2 through 6, for six objectives (O) 100, there would be 6 different score matrices 710 as illustrated in Table 6.

The tool 200 may execute the average scoring module 714 for each of the plurality of attribute score matrices 806. Each averages score module may be individually designated as AVG(ATT(O*,S$_f$)). The average scoring module 714 may generate an average score set 808 for each plurality of attribute score matrices 806. Each average score set 808 may include an average attribute score (AS) for each attribute included in each plurality of attribute score matrices 806. Thus, for each plurality of attribute score matrices 806, the average scoring module 714 may generate a plurality of average attribute scores 716 for each attribute as associated with a particular service (S) 102 for each objective O*. For example, if the number of objectives included in the plurality of objectives O* equaled six, then the attribute score matrices (ATT (PA(O*,S$_1$)) 806 as processed by the average scoring module 714 may generate a plurality of average attribute scores 716 associated with the service S$_1$ for each of the six objectives (O) 100. Thus, for one attribute (ATT) in data set (ATT(P(O*, S$_1$)), there may be six average scores. In the example with regard to Tables 2 through 6, there would be six average scores for each attribute category 602.

Upon generation of the average scores 716, the tool 200 may execute the overall scoring module 718 for each of the plurality of attribute score matrices 806. The overall scoring module 718 may generate overall scores 812. Each overall score 812 is individually designated as (Score(S$_f$(O*))) representing the overall strength of each particular service (S) 102 as related to each of the plurality of the objectives O*. For example, if the number of objectives included in the plurality of objectives O* equaled six, then each six overall scores may be generated for each service S$_f$. Each individual overall strength score (Score(S$_f$(O*))) may be determined through a weighted sum of the corresponding process attribute scores such as through use of Equation 1.

The overall scores (OS) may allow an organization to determine the strength of services (S) 102 with regard to particular objectives (O) 100. The overall scores (OS) provide an indicator as compared to a predetermined benchmark to determine the strength of each service (S) 102 as related to a particular process. The overall scores (OS) allow an organization to determine particular strengths and weaknesses regarding particular services, which may be subsequently corrected to enhance the capabilities of an organization.

Figure 9:
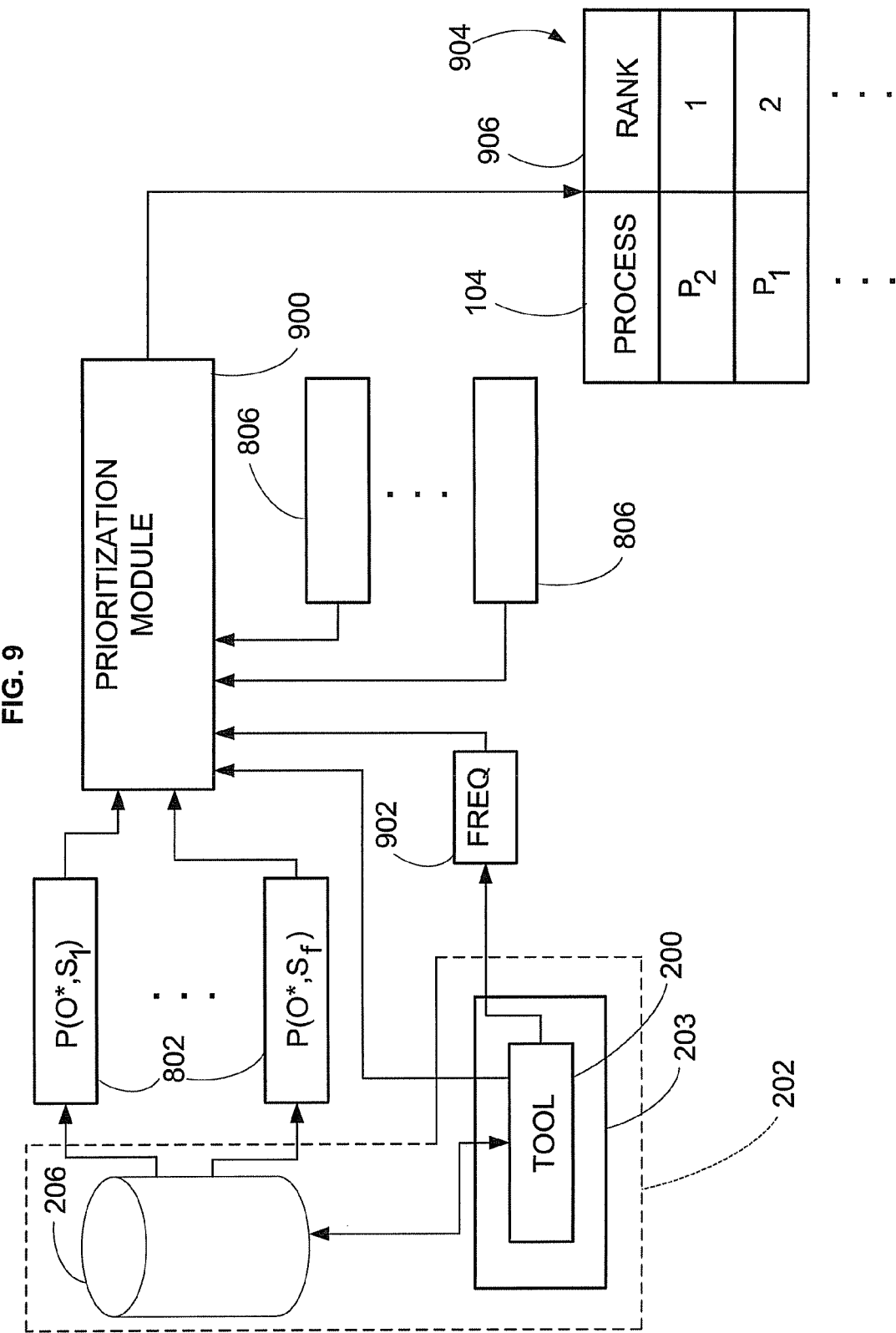
FIG. 9 is an example of a tool configured to identify processes for adjustment with regard to the plurality of service strengths of FIG. 7.

Further layers of analysis may be implemented based on results from the scoring modules. For example, in FIG. 8, a process (P) 104 may be associated with more than one service (S) 102. Thus, a particular process (P) 104 may contribute to more than one overall score 720. Upon generating the overall scores 720, a prioritization matrix may be generated by the tool 200, as shown in FIG. 9. In one example, the tool 200 may identify a frequency of association for each particular process (P) 104 in each of the data sets 802. The tool 200 may review the data sets 802 to determine the frequency that each process (P) appears with respect to a particular objective (O) 100. For example, each objective (O) 100 may have a plurality of related services (S) 102. These related services (S) 102 may share particular processes (P) 100. Thus, each process (P) 104 may be associated with each objective (O) multiple times. Based on these relationships, the tool 200 may determine the number of times a particular process (P) 104 is associated with a particular objective (O) 100 for each process (P) 104 to serve as the frequency association.

The tool 200 may execute a prioritization module 900 to determine which processes (P) 104, if improved, may provide the maximum impact in increasing the overall scores 720. For example, the tool 200 may determine the frequency that each process (P) 104 appears in the data sets 802 and generate a frequency data set 902 to include the determined frequency. The prioritization module 900 may process the frequency data set 902, as well as the attribute score matrices 806 to cross reference particular attribute scores for each process. For example, the prioritization module 900 may select the Content Details, KPI, and CAM scores for each process (P) 104.

The prioritization module 900 may process the frequency data set 902 and the Content Details attribute to determine that a particular process (P) 104, if improved, would provide a maximum increase of the overall scores 720 as compared to the other processes (P) 104. In one example, processes (P) 104 may be prioritized according to the equation:

$$PS_P = FR_P * (3 - ((\text{Content Details})_P + KPI_P + CAM_P)) \quad \text{(Eqn. 2)}$$

where $PS_P$ is the prioritization score for a particular process (P) 104, $FR_P$ is the frequency of association of the particular process (P) 104, (Content Details)$_P$ is the Content Details score of the particular process (P) 104, $KPI_P$ is the KPI score for the particular process (P) 104, and $CAM_E$ is the CAM score for the particular process (P) 104. The prioritization score (PS) for a particular process (P) 104 may indicate the impact on improvement the particular process (P) 104 may have on the overall scores as compared to the other processes (P) 104.

In one example, a first process $P_1$ may have a greater frequency of association than a second process $P_2$. However, the first process $P_1$ may be more developed, thus having a higher Content Details score. While process $P_2$ may appear less frequently, the process $P_2$ may have greater room for improvement with regard to the Content Details attribute. Thus, based on Equation 2, improving the Content Details attribute of the process $P_2$ may provide a greater impact than improving the Content Details attribute of the process $P_1$. The example of processes $P_1$ and $P_2$ may be expanded to be used for all processes identified in the data sets 802. Thus, in FIG. 9, the prioritization module 900 may generate a prioritization matrix 904. The prioritization matrix 904 may include the processes (P) 104 and the process rank 906. The process rank 906 may be based the prioritization score of Equation 2. The highest prioritization score (PS) indicates the highest rank 906. The process rank 906 indicates the process' (P) 104 order from maximum to minimum increase upon the overall scores 720 if the particular process (P) 104 is improved. For example, in the prioritization matrix 904, improvement of process $P_2$ would improve the overall scores 720 more than improvement of any other process. Thus, process $P_2$ has a rank of "1."

Figure 10:
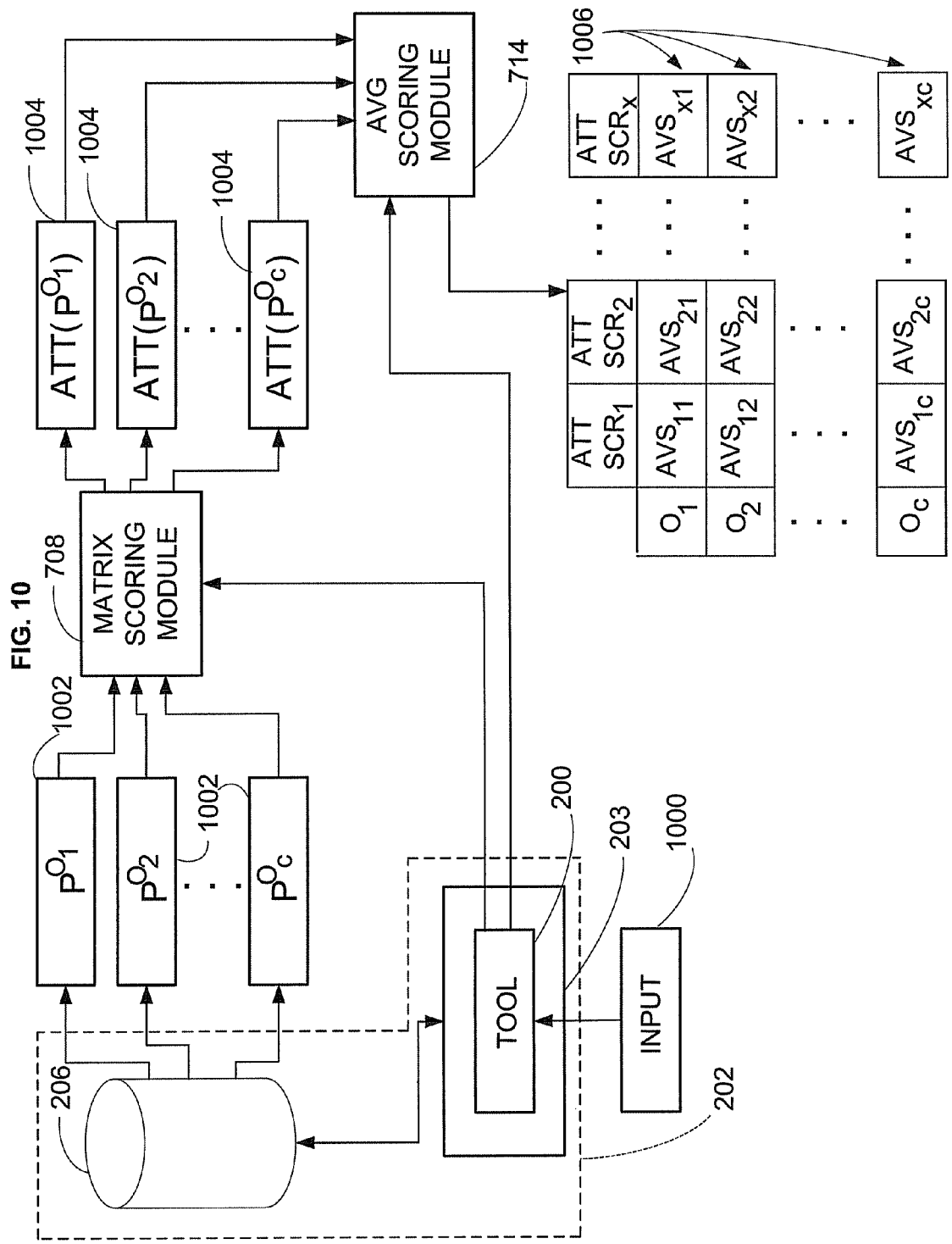
FIG. 10 is an example of a tool configured to determine a plurality of process strengths as related to a plurality of objectives.

Each of the objectives (O) 100 may be related to a common aspect, such as a market segment for example. The strength of individual processes (P) 104 may be directly scored with respect to the objectives (O) 100 related to a common aspect. In FIG. 10, the processor 202 may be configured to determine average scores of process attributes for processes (P) 104 directly related to a number of objectives (O) 100. In FIG. 10, the processor 203 may receive an input 1000 indicative an objective-related aspect, such as a market segment. The tool 200 may access the database 206 based on the input 1000 to identify particular objectives (O) 100 associated with the input 1000. Based on the input 1000, the tool 200 may retrieve process information (PA) related to each process (P) 104 associated with the identified objectives. For example, Table 3 illustrates processes (P) 104 directly related to the M&A and working capital objectives.

In FIG. 10, process information data sets 1002 may be accessed by the processor 202. Each data set 1002 is individually designated as $P^{O1}$ through $P^{Oc}$, where "c" generally represents an index of the "n" number of objectives (O) 100 stored in the database 206. In alternative examples, a single objective may be identified. Each data set 1002 may include process information for each process (P) 104 related to a particular objective ($O_c$). Thus, each data set 1002 may include one or more data sets, such as the data set 600 in FIG. 6. The process-objective relationship may be determined based on data illustrated as data set 400 in FIG. 5. The process attributes (PA) in data set 600 may be cross-referenced based on the data set 400 to determine the process information (PA) to be included in each data set 1002.

The tool 200 may execute the matrix scoring module 706 to score each data set 600 included in each of the data sets 1002 to generate a plurality of attribute score matrices 1004. Each individual attribute score matrix is designated as "ATT($P^{Oc}$)." Each attribute score matrix 1004 may include an attribute score for a process attribute (PA) of each process (P) 104 with respect to a particular objective $O_c$. The tool 200 may execute the average scoring module 714 for each attribute score matrix 1004 to generate a plurality of average scores sets 1006. Each average score set 1006 may include an average score (AVS) for each attribute with respect to a particular objective ($O_c$). Each average score (AVS) is individually designated as ($AVS_{yz}$), where "y" is the index of the attribute (ATT) and "z" is the index of the objective O1 through $O_c$.

Figure 11:
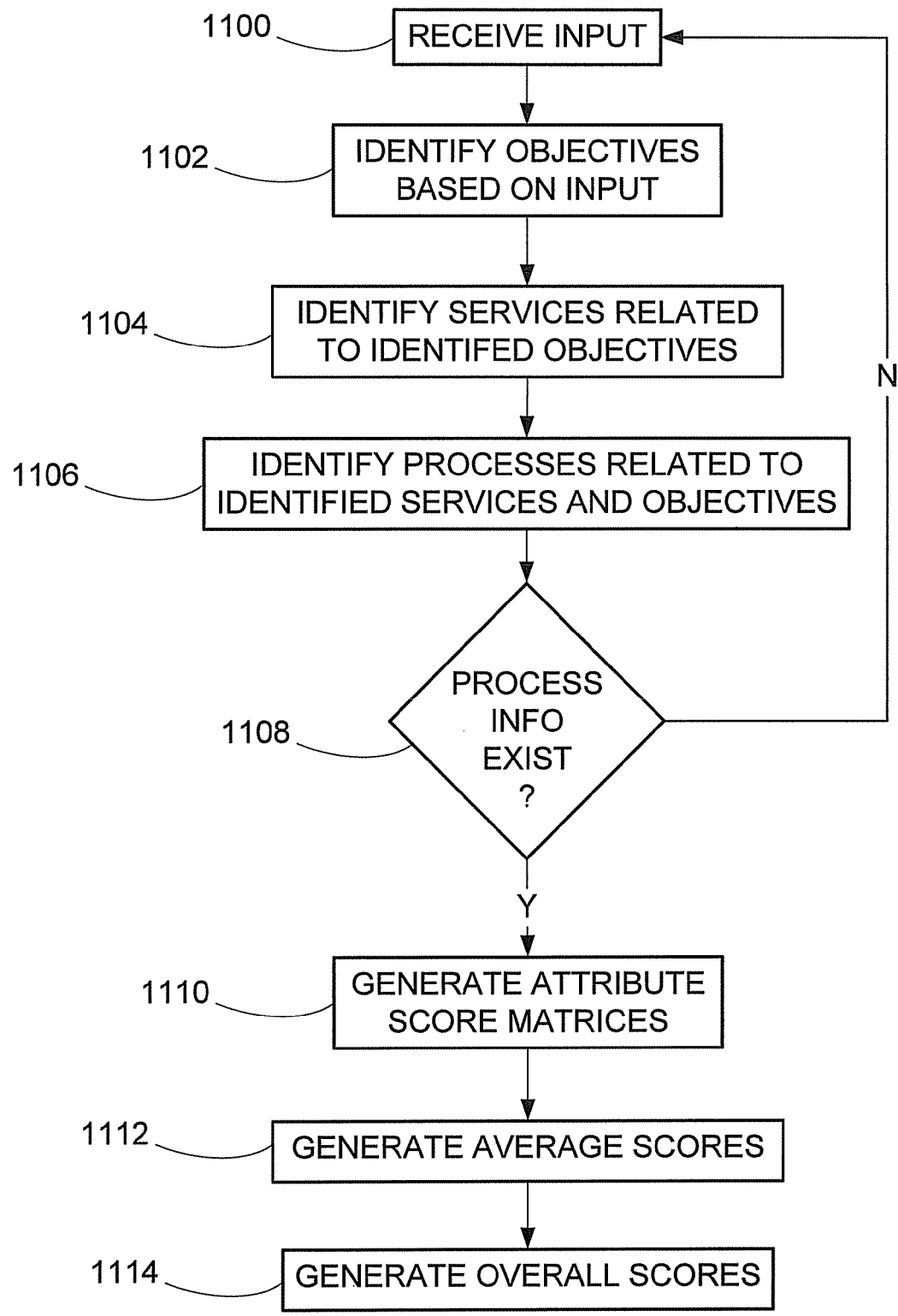
FIG. 11 is a flow diagram of an example operation of the tool of FIGS. 7 and 8.

FIG. 11 is an example flow diagram of operating the computer device 202. At block 1100, the tool 200 of the computer device 202 may receive an input, such as the input 800. At block 1102, the tool 200 may identify one or more objectives (O) 100 based on the input 800 through accessing the database 206. At block 1104, the tool 200 may identify one or more services (S) 102 related to the identified objectives (O) 100. At block 1106, the tool 200 may identify one or more processes associated with each identified service (S) 102 and each identified objective (O) 100.

At block 1108, the processor 203 may determine if process information (PA) associated with the identified processes is present. If process information (PA) is not present for any of the identified processes (P) 104, the operation may return to block 1100. If process information (PA) is present, at block 1110 the tool 200 may execute the matrix scoring module 708 to generate an attribute score matrices 710 including attribute scores for each identified process (P) 104 as related to each identified service (S) 102 and objective (O) 104. At block 1112, the tool 200 may execute the average scoring module 714 to generate average scores 716 for each attribute (ATT) associated with each attribute score matrix 710 determined at block 1110. At block 1114, the tool 200 may execute the overall scoring module 718 to generate an overall scores 720 for each identified service (S) 102 as it relates to each identified objective (O) 100 based on the averages scores 716 determined at block 1112.

While various embodiments of the innovation have been described, it will be apparent to those of ordinary skill in the art that many more embodiments and implementations are possible within the scope of the innovation. Accordingly, the innovation is not to be restricted except in light of the attached claims and their equivalents.

I claim:

1. An organization-assessment system comprising:
   a database configured to store respective process information associated with a plurality of processes; and
   a processor in communication with the database, the processor configured to retrieve an objective associated with the organization and save in the database the respective process information associated with the plurality of processes, where said process information is generated based on modeling or calculating by the processor, or activity information;
   the processor further configured to:
      identify a service associated with the at least one objective;
      identify a subset of processes associated with the service from the plurality of processes;
      filter the subset of processes to identify a plurality of objective-based processes, wherein each of the objective-based processes is a process used to achieve the objective;
      retrieve the respective process information from the database for each of objective-based processes;
      identify an objective-based process of the plurality of objective-based processes based on a frequency of association and based on predetermined process attributes, wherein the identified objective-based process has a projected maximum impact on an overall strength score upon adjustment of the identified objective-based process;
      generate a first scoring matrix based on the respective process information of the plurality of objective-based processes, wherein the scoring matrix includes a plurality of scores, and wherein each of the plurality of scores in the scoring matrix is associated with one of the plurality of objective-based processes, and is representative of a strength of one of a respective plurality of predetermined process attributes;
      rank the plurality of objective-based processes based on the frequency of association for each objective-based process and at least one score associated of each objective-based process associated with one of the process attributes, wherein the rank is determined based on a score for each of the plurality of objective-based processes determined by the formula: Score=FR*(3−((Content Details)+KPI+CAM), wherein FR is the frequency of association, Content Details is a Content Details attribute score, KPI is a key performance indicator attribute score, and CAM is a capability assessment model score;
      determine a respective average score for each of the predetermined process attributes based on the plurality of scores of the first scoring matrix, wherein each respective average score is representative of an average strength of each of the predetermined process attributes with respect to the objective; and
      determine a plurality of overall strength scores based on respective average scores based on the first scoring matrix, wherein each of the plurality of overall strength scores is representative of an overall strength of the services with respect to the objectives.

2. The system of claim 1, wherein the processor is further configured to:
  determine a frequency of association of each objective-based process with the plurality of services; and
  identify at least one of the objective-based processes having a projected maximum impact at least one of the overall strength scores based on the frequency of association and at least one score associated with one of the process attributes of the at least one objective-based process.

3. The system of claim 1, wherein the processor is configured to:
  retrieve the objective, wherein the objective is a customer-related objective.

4. The system of claim 3, wherein the processor is further configured to:
  select the customer-related objective from a group consisting of customer care transformation, customer information systems transformation and application support, and customer care business transformation outsourcing.

5. The system of claim 1, wherein the processor is further configured to:
  retrieve the objective selected from a group consisting of short term debt, cost containment, mergers and acquisitions, margin management, working capital, capital projects, customer acquisition; and workforce reduction.

6. The system of claim 1, wherein at least one of the predetermined process attributes includes content details, capability assessment model definition existence, key performance indicator definition existence, and classification of process.

7. A non-transitory computer-readable medium comprising a plurality of instructions executable by a processor, the computer-readable medium comprising:
  instructions to store process information in a database, wherein the process information is associated with a plurality of processes, wherein the process information includes at least one of modeling, calculation, or activity information related to one of the processes;
  instructions to retrieve an objective from the database;
  instructions to identify a service associated with the one objective;
  instructions to identify a subset of processes associated with the service from the plurality of processes;
  instructions to filter the subset of processes to identify a plurality of objective-based processes, wherein each objective-based process is a process used to achieve the at least one objective;
  instructions to retrieve respective process information from the database for each of the objective-based processes;
  instructions to identify an objective-based process of the plurality of objective-based processes based on a frequency of association and based on predetermined process attributes, wherein the identified objective-based process has a projected maximum positive impact on an overall strength score by adjustment of the identified objective-based process;
  instructions to generate a first scoring matrix based on the respective process information of the plurality of objective-based processes, wherein the scoring matrix includes a plurality of scores, wherein each of the plurality of scores in the scoring matrix is associated with one of the plurality of objective-based processes, and is representative of a strength of one of a respective plurality of predetermined process attributes;
  instructions to rank the plurality of objective-based processes based on the frequency of association for each objective-based process and at least one score associated of each objective-based process associated with one of the process attributes, wherein the rank is determined based on a score for each of the plurality of objective-based processes determined by the formula: Score=FR* (3−((Content Details)+KPI+CAM), wherein FR is the frequency of association, Content Details is a Content Details attribute score, KPI is a key performance indicator attribute score, and CAM is a capability assessment model score;
  instructions to determine a respective average score for each of the predetermined process attributes based on the plurality of scores of the first scoring matrix, wherein each respective average score is representative of an average strength of each of the predetermined process attributes with respect to the objective; and
  instructions to determine a plurality of overall strength scores based on the respective average scores based on the first scoring matrix, wherein each of the plurality of overall strength scores is representative of an overall strength of the services with respect to the objectives.

8. The non-transitory computer-readable medium of claim 7 further comprising:
  instructions to determine a frequency of association of each of the objective-based processes with the plurality of services; and
  instructions to identify at least one objective-based process based on the frequency of association and at least one score associated with one of the process attributes of the at least one objective-based process, wherein the identified at least one objective-based process has a projected maximum impact on at least one overall strength score upon adjustment of the identified at least one objective-based process.

9. The non-transitory computer-readable medium of claim 8, further comprising:
  instructions to rank a plurality of objective-based processes based on the frequency of association for each objective-based process and at least one score associated of each objective-based process associated with one of the process attributes; and
  instructions to identify at least one of the plurality of objective-based processes having a highest rank as having the projected maximum impact on increasing the overall strength score upon improvement of the identified at least one of the plurality of objective-based processes.

10. The non-transitory computer-readable medium of claim 7, wherein an objective-based process having the highest score relative to other objective-based processes is identified as having the highest rank.

11. The non-transitory computer-readable medium of claim 7 further comprising instructions to retrieve the objective selected from a group consisting of short term debt, cost containment, mergers and acquisitions, margin management, working capital, capital projects, customer acquisition, and workforce reduction.

12. The non-transitory computer-readable medium of claim 7 further comprising instructions to identify the first service from a group consisting of customer care transformation, customer information systems transformation and application support, customer care business transformation outsourcing, business process capacity services, demand management, and business process outsourcing services.

13. The non-transitory computer-readable medium of claim 7, wherein at least one of the predetermined process attributes includes content details, capability assessment model existence, key performance identifier existence, and classification of process.

14. An organizational-assessment system comprising:
a database configured to store respective process information associated with a plurality of processes, wherein the respective process information includes at least one of modeling, calculation, or activity information; and
a processor in communication with the database, the processor configured to retrieve an objective from the database;
the processor further configured to identify a subset of processes as objective-based processes, where each of the objective based processes is associated with accomplishing the objective;
the processor further configured to retrieve the respective process information from the database for each of the objective-based processes;
the processor further configured to execute a first scoring module executable to convert the respective process information of the objective-based processes into a scoring matrix, wherein the scoring matrix includes a plurality of scores, wherein each of the plurality of scores in the scoring matrix is associated with one of the plurality of objective-based processes, and wherein each of the plurality of scores in the scoring matrix is representative of a strength of one of a plurality of predetermined process attributes;
the processor further configured to rank the plurality of objective-based processes based on the frequency of association for each objective-based process and at least one score associated of each objective-based process associated with one of the process attributes, wherein the rank is determined based on a score for each of the plurality of objective-based processes determined by the formula: Score=FR*(3−((Content Details)+KPI+CAM), wherein FR is the frequency of association, Content Details is a Content Details attribute score, KPI is a key performance indicator attribute score, and CAM is a capability assessment model score;
the processor further configured to execute a second scoring module executable to determine a respective average score for each predetermined process attribute based on the plurality of scores of the scoring matrix, wherein each respective average score is representative of an average strength of each predetermined process attribute with respect to the objective; and
the processor further configured to execute a third scoring module executable to determine a plurality of overall strength scores based on the respective average scores based on the scoring matrix, wherein each of the plurality of overall strength scores is representative of an overall strength of the services with respect to the objectives.

15. The system of claim 14, wherein the at least one of the predetermined process attributes includes content details, capability assessment model existence, key performance identifier existence, and classification of process.

\* \* \* \* \*

UNITED STATES PATENT AND TRADEMARK OFFICE
CERTIFICATE OF CORRECTION

| | | |
|---|---|---|
| PATENT NO. | : 8,510,152 B1 | |
| APPLICATION NO. | : 12/466172 | |
| DATED | : August 13, 2013 | |
| INVENTOR(S) | : Saurabh Rai | |

It is certified that error appears in the above-identified patent and that said Letters Patent is hereby corrected as shown below:

<u>In the Specification</u>

In column 9, line 37, after "score for a particular" replace "a ibute" with --attribute--.

Signed and Sealed this
First Day of April, 2014

Michelle K. Lee
*Deputy Director of the United States Patent and Trademark Office*